United States Patent [11] 3,616,020

[72] Inventors Mark W. Whelan;
 Arthur J. Sedani, both of Chippewa Falls, Wis.
[21] Appl. No. 791,394
[22] Filed Jan. 15, 1969
[45] Patented Oct. 26, 1971
[73] Assignee Standard Oil Company
 Chicago, Ill.

[54] EXTRUSION COATING OF A HEAT FUSIBLE FOAM SHEET
 20 Claims, 2 Drawing Figs.
[52] U.S. Cl. ..................................................... 156/244, 156/309, 156/324
[51] Int. Cl. ..................................................... B29c 19/00
[50] Field of Search........................................... 156/244, 324, 306, 309, 494; 264/177

[56] References Cited
UNITED STATES PATENTS
| | | | |
|---|---|---|---|
| 3,322,610 | 5/1967 | Brooks et al. | 156/244 X |
| 3,499,816 | 3/1970 | Areskoug | 156/244 X |

*Primary Examiner*—Benjamin R. Padgett
*Assistant Examiner*—Stephen J. Lechert, Jr.
*Attorneys*—Arthur G. Gilkes, William T. McClain and Ralph C. Medhurst ABSTRACT: A process for continuously coating two sides of a heat fusible foam sheet with a resinous polymeric material, having the steps of: (1) melting the resinous polymeric material; (2) extruding the resinous polymeric material through a flat film die; (3) continuously passing the heat fusible foam sheet past the flat film die; (4) contacting the heat fusible foam sheet and the resinous polymeric material; (5) compressing the contacted heat fusible foam sheet and resinous polymeric material; (6) limiting the amount of reverse wrap of the heat fusible foam sheet and; (7) controlling the linear tension on the heat fusible foam sheet.

INVENTORS.
Mark W. Whelan
Arthur J. Sidanl

INVENTORS.
Mark W. Whelan
Arthur J. Sidani

EXTRUSION COATING OF A HEAT FUSIBLE FOAM SHEET

BACKGROUND OF THE INVENTION

In the early stages of developing extruded heat fusible foam sheet such as polystyrene foam sheet it appeared that if properties of high gloss and high strength could be imparted to one surface of the sheet, dishes and the like, having a desirable chinalike surface, could be thermally formed and trimmed from the sheet. It was found that coating the heat fusible foam sheet with a resinuous polymeric material would provide the desired strength and gloss properties. The physical properties of the product of coating heat fusible foam sheet with resinous polymeric materials were found to be superior to the properties of either the heat fusible foam sheet or the resinous polymeric material alone. The gloss, rigidity, abrasion resistance and cut resistance of extruded polystyrene foam sheet were substantially improved with a resinous polymeric material coating, and, conversely, a resinous polymeric material film was substantially improved in its insulative properties rigidity and toughness when combined with an extruded foam polystyrene substrate. Previously heat fusible foam sheets have been coated on one side only, since typical coating processes could not be used to coat the second side. However, the desirable properties obtained by coating one side of a heat fusible foam sheet were found to be significantly increased by coating the second side. Such sheets coated on both sides lend themselves to being formed into products which are superior to products formed from single side coated foam sheets.

SUMMARY OF THE INVENTION

The invention is an improvement in the process for coating a heat fusible foam sheet with a polymeric resinous material. The improvement includes limiting the amount of reverse wrap and controlling the linear tension on the heat fusible foam sheet so that its second side may be coated. Reverse wrap as used in the specification and claims means wrapping the heat fusible foam sheet on a roller or multiplicity of rollers so that it forms an arc, and, in the case of a continuous coating process, changes the direction of travel of the sheet by more than 90°. To avoid cracking of the coating and sheet the diameter of the arc must not be too small. The minimum diameter varies with the number of coated sides and thickness of the sheet.

The prior art process upon which the invention of this application is an improvement is a continuous process for coating heat fusible foam sheet with a polymeric resinous material. The process includes heating the resinous material in an extruder, such extruder being any of those types in common use in the plastics industry, having a heating means and a compression means. Resinous polymeric material is melted in an extruder whereupon it is forced out of the barrel and through a flat film die under a pressure in the range of about 1,000 and 5,000 pounds per square inch. As used in the specification and claims the term melted means plasticized by heat until extrudable. The flat film die desirably has a gap or opening of from 2 to 100 thousandths of an inch and an effective width approximately equal to the width of the heat fusible foam sheet to be coated. The die can be provided with conventional heating means.

The molten resinous polymeric material is continuously extruded through the die and onto the heat fusible foam sheet which is moving past the die. The coated polystyrene foam is then compressed between two rollers, a nip roller and a chill roller. The nip roller is preferably heated to between 100° and 200° F. and the chill roller is preferably cooled to between 40° and 80° F. The temperature of the rollers should be controlled so that the polymeric resinous material does not cool so much that it cannot melt a thin layer of the heat fusible foam sheet and fuse thereto. The clearance between these two rollers, which causes the polymeric resinous material and the heat fusible foam sheet to be compressed is commonly referred to as the nip. In the practice of this invention the nip pressure per linear inch must be adequate to press the coating into the foam substrate. Such a nip pressure is that generally sufficient to compress the coated foam sheet to about one-half its normal thickness. The foam, being resilient, regains a majority of its original thickness after being compressed. After compression the laminate is held in contact with the chill roller which cools it and which can also impart desirable surface characteristics to the polymeric resinous layer. For example, if a mirror surface is desired a highly polished chill roller should be used.

There are two modes of practice of this invention. One, is using a two extruder line; the other, is, using a one extruder line and running the one side-coated heat fusible foam sheet through a second time. It should be clear that the design of the single extruder line must be in accordance with the invention described herein so that the second side of a one-side coated heat fusible foam sheet may be coated, even though a different design would be suitable for coating only one side. If a two extruder line is used it is necessary to reverse wrap the one-side coated heat fusible foam sheet at least once so that its underside can be exposed to a second extruder in the line.

In either mode of practice of this invention it may become necessary to reverse wrap the laminate product which now has both sides coated. Such necessity may arise from a desire to change the direction of travel of the laminate, so that overall movement of the heat fusible foam sheet is unidirectional, or from a desire to wind the laminate product on a roll for convenience of shipping. When such reverse wrapping is desired, the arc of the two-side coated laminate must be even more carefully controlled than when reverse wrapping the one-side coated heat fusible foam sheet.

The tension on the coated heat fusible foam sheet must be carefully controlled to insure a wrinkle free product. The bond between the resinous polymeric material and the second side of the heat fusible foam sheet is formed in the same way as the bond between the resinous polymeric material and the first side, that is, the surface of the heat fusible foam sheet is melted when contacted by the extruded resinous material and, upon cooling it bonds the resinous material thereto.

DESCRIPTION OF THE DRAWINGS

In FIG. 1 the heat fusible foam sheet 10 travels from an unwind station 11 through a tension control 12 and onto a nip roller 14, which is a roller that forms a nip or compression means with a second roller. The heat fusible foam sheet 10 is then coated with a polymeric resinous material extruded through a flat film die 15 attached to extruder 13. The coated sheet 16 is then transferred to a chill roller 17 which is a cooled roller opposite the nip roller which forms a part of the compression means and also imparts desirable surface characteristics to the coating. The coated heat fusible foam sheet 16 is next transferred to a third roller 18 which enables it to remain in contact with the chill roller 17 for about one-half of its circumference. The coated side having been last coated does not contact the surface of the third roller 18. The three rollers referred to above are externally powered to impart motion to the heat fusible foam sheet 10. The coated sheet 16 is then passed through tension control 19 and wound upon a rewind roll at the rewind station 20 and transferred back to the unwind station 11 to be coated on the other side.

In FIG. 2 the heat fusible foam sheet 20 travels from an unwind station 21 through a prior heat fusible foam sheet coating process. The improvement of this invention as disclosed herein is seen beginning with roller 6, which is the lead-in roller to the second extruder in tandem with the first. The one-sided coated heat fusible foam sheet 22 passes roller 6 through a tension control 23 and is reverse wrapped on roller 7. It than passes on to the nip roller 8 which is a roller that forms a nip or compression means with a second roller. It is while the one-side coated heat fusible foam sheet is upon the nip roller 8 that its second side is coated with a polymeric resinous material extruded through a flat film die 26 attached to extruder 28. The two-side coated sheet is then transferred to a chill roller 9 which is a colled roller opposite the nip roller which forms a part of the compression means and also imparts desirable surface characteristics to the coating. It is also reverse wrapped on each of these rollers. The heat fusible foam sheet is then passed on to a third roller 10 which enables it to remain in contact with the chill roller for about one-half of its circumference The coated side having been last coated does not contact the surface of the third roller. The nip roller 8, the chill roller 9 and the third roller 10 referred to above are all externally powered to impart motion to the heat fusible foam sheet. The two-side coat heat fusible foam sheet 27 is then passed on to roller 11 where it is reverse wrapped to give it a unilateral direction in the overall process. Next the two-side coated heat fusible foam sheet 27 is run on roller 12 and roller 13 through a tension control 24 and onto a rewind roll at the rewind station 25.

PREFERRED EMBODIMENTS

Figure 1:
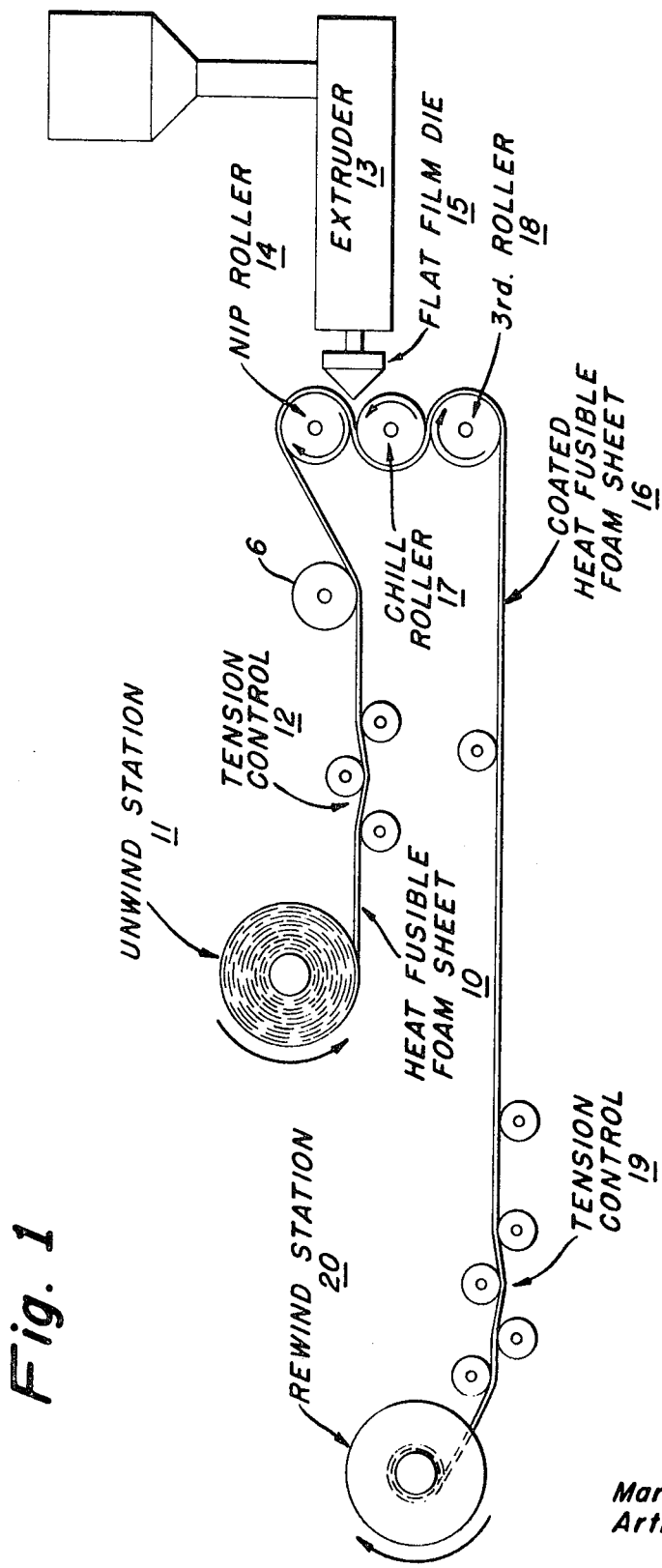
FIG. 1 shows one mode of practice of the invention wherein a one extruder line is modified in accordance with the invention disclosed herein to allow coating of two sides of the heat fusible foam sheet by passing it through the line twice.
Figure 2:
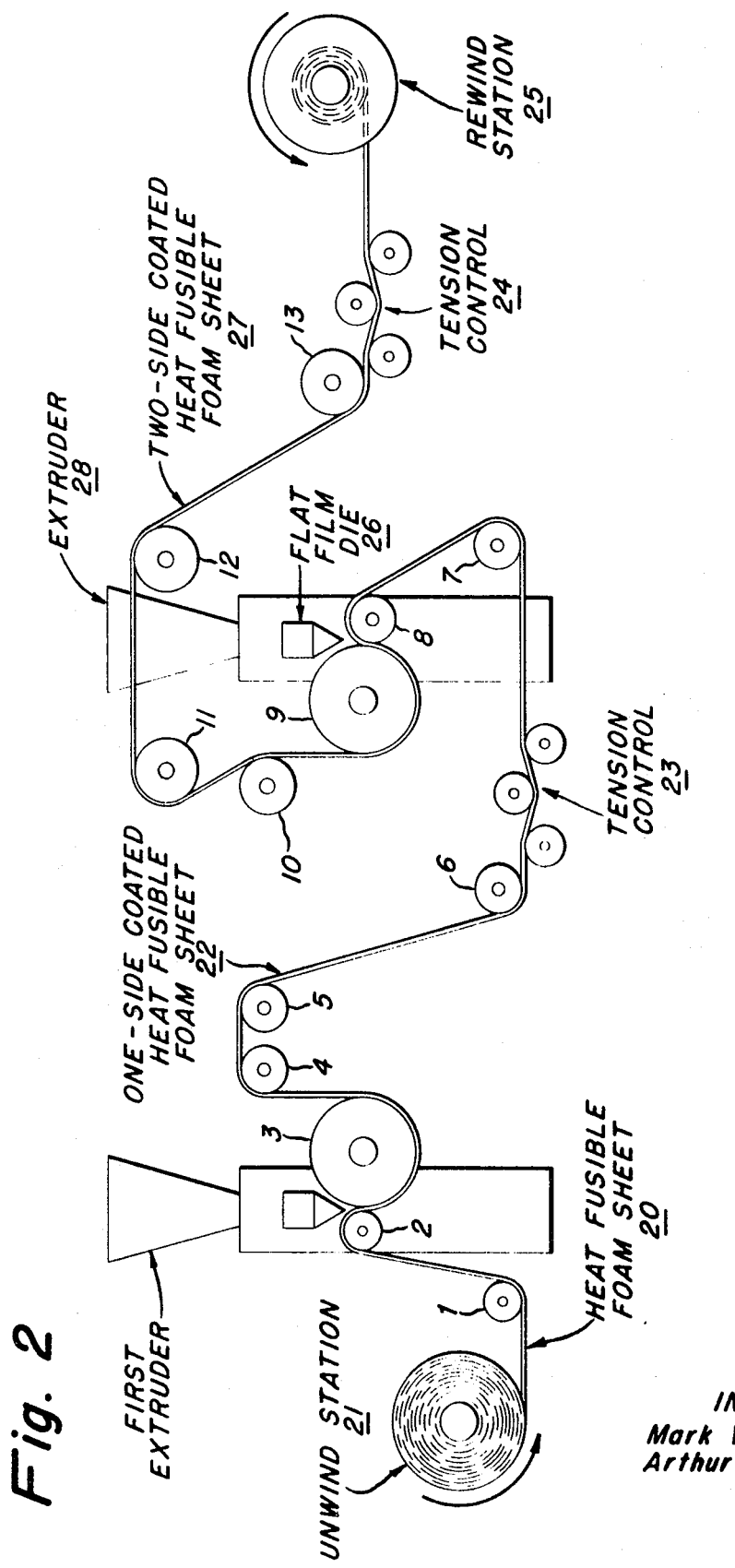
FIG. 2 shows a second mode of practice of the invention wherein two extruders are employed in tandem to form a two extruder line.

The preferred extruder has a barrel, a heating means and a compression means. The compression means of the extruder is an auger contained inside the barrel having from 18 to 30 flights (revolutions of the helical inclined plane along the length of the barrel). The heating means is either an electric or oil heater positioned outside and along the barrel to create independently controlled heat zones inside the barrel. Some heat is also provided by working of the material in the auger compression means. The barrel temperature should be between 400° and 475° F., the barrel having an inside diameter of between 1 and 12½ inches. The polymeric resinous material can thus be extruded in a continuous operation.

It is preferred that extrusion be through a heated flat film die. The temperature of the die is held between 375° and 500° F. by either an electric or an oil heater. The pressure inside the die will generally fall in the range of 1,000 to 5,000 p.s.i. depending upon the polymeric resinous material used. The die pressure is preferably 1,5000 p.s.i. The gap (opening) in the die is approximately 2 to 100 thousandths of an inch, preferably 10 thousandths, with the width of the die varying with the width of the heat fusible foam sheet to be coated.

For best results it is important that the molten resinous coating material contact the heat fusible foam sheet while it is still on the nip roller. Contacting the two materials at this point insures that the resinous polymeric material will contact the foam sheet while it is being held smooth and free from wrinkles. The product will then be free of wrinkles and surface imperfections. It has also been found that rotating the nip roller between 0 and 10 percent slower (based on the surface speed) than the chill roller and the third roller between 0 and 10 percent faster (based on surface speed) than the chill roller results in a more smooth and uniform product. It has been found that about 2 percent variance in speed (based on the surface speed) is the optimum. In addition, the tension on the heat fusible foam sheet is controlled by two tension controls (shown in the figures). The preferred tension on the coated sheet coming off the rolls is between 6 and 20 pounds per linear inch.

The linear speed of the heat fusible foam sheet as it travels from the unwind station to the rewind station is dependent upon the thickness of the polymeric resinous material to be applied, the output of the polymeric resinous extruder and the capabilities of the unwind station and the rewind station (shown in the figures). Speeds can range from 100 to 2,000 feet per minute depending upon these variables.

Various heat fusible foam sheets can serve as the substrate in the coating process of this invention. The following are examples of the more important foams which can be coated: polystyrene, styrene copolymers, polyethylene, polypropylene and polyvinylchloride. It should be noted, however, that polyethylene and polypropylene foam sheets are only effective as substrates when they are being coated with polyethylene and polypropylene respectively. Similarly, polyethylene and polypropylene are only effective as coating materials when polyethylene and polypropylene foam sheets are the respective substrates.

The compression of the polymeric resinous material onto the heat fusible foam sheet substrate may be effected without nip compression by increasing the linear tension of the foam substrate, thereby causing the polymeric material to be compressed slightly as it is wrapped between the nip roll and the foam substrate. Suitable polymeric resinous materials are acrylonitrile-butadiene-styrene, acrylonitrile styrene, polyvinylchloride, crystalline polystyrene, polyethylene, polypropylene or rubber modified polystyrene. The polyethylene and polypropylene are, of course, limited to polyethylene and polypropylene substrates respectively.

EXAMPLE I

Referring to FIG. I, the following table shows the minimum arc diameters which can be used in conjunction with one-side coated heat fusible foam sheets of various thicknesses in a one extruder line while coating the second sides thereof.

| Roller Number | Heat Fusible Foam Sheet Thickness in Mils | | |
|---|---|---|---|
| | Below 50 | 50 to 75 | 76 to 99 |
| | Arc Diameter, inches | | |
| 6 | 9 | 15 | 24 |
| 14 | | 9 15 | 24 |
| 17 | 12 | 18 | 30 |
| 18 | 12 | 18 | 30 |
| Roller at unwind station 11 | 9 | 15 | 24 |
| Roller at rewind station 20 | 12 | 18 | 30 |
| All other rollers | 6 | 12 | 18 |

The process described and set forth in FIG. I using the above arc diameters for various thicknesses of heat fusible foam sheet substrate results in a successful commercial operation.

EXAMPLE II

Referring now to FIG. II, the following table shows the minimum arc diameters which can be used in conjunction with heat fusible foam sheets of various thicknesses through the entire coating process.

| Roller Number | Heat Fusible Foam sheet Thickness in Mils | | |
|---|---|---|---|
| | Below 50 | 50 to 75 | 76 to 99 |
| | Arc Diameter, inches | | |
| 1 | 6 | 12 | 18 |
| 2 | 6 | 12 | 18 |
| 3 | 36 | 36 | 36 |
| 4 | 9 | 15 | 24 |
| 5 | 9 | 15 | 24 |
| 6 | 9 | 15 | 24 |
| 7 | 9 | 15 | 24 |
| 8 | 9 | 15 | 24 |
| 9 | 36 | 36 | 36 |
| 10 | 12 | 18 | 30 |
| 11 | 12 | 18 | 30 |
| 12 | 12 | 18 | 30 |
| 13 | 12 | 18 | 30 |
| Roller at rewind station 25 | 12 | 18 | 30 |
| All other rollers | 6 | 12 | 18 |

The process described and set forth in FIG. II using the above roller diameters for various thicknesses of heat fusible foam sheet substrates results in a successful commercial operation.

In examples I and II the ratio of arc diameter to heat fusible foam sheet thickness is never less than 180 when a one-side coated heat fusible foam sheet is reverse wrapped. The ratio of arc diameter to heat fusible foam sheet thickness is never less than 240 when a two-side coated heat fusible foam sheet is reverse wrapped.

Reverse wrapping as defined herein occurs in FIG. I of Example I at rollers 14, 17, 18 and the roller at the rewind station. It is being understood that in example I the roller at the unwind station will have a reverse wrapped one-side coated heat fusible foam sheet thereon when the second side is being coated, and corresponding rollers 17, 18 and the roller at the rewind station will have the two-side coated heat fusible foam sheet reverse wrapped thereon. Reverse wrapping in FIG. II of example II occurs at rollers 2, 3, 7, 8, 9, 11 and the roller at the rewind station.

We claim:

1. A process for coating two sides of a heat fusible foam sheet with a resinous polymeric material comprising: (1) melting the resinous polymeric material; (2) extruding the resinous polymeric material onto both sides of the heat fusible foam sheet through a flat film die; (3) continuously passing the heat fusible foam sheet past the flat film die; (4) contacting the heat fusible foam sheet and the resinous polymeric material; (5) compressing the contacted heat fusible foam sheet and resinous polymeric material; (6) limiting the amount of reverse wrap of the heat fusible foam sheet and; (7) controlling the linear tension on the heat fusible foam sheet.

2. The process of claim 1 wherein extruding the resinous polymeric material onto both sides of the heat fusible foam sheet is accomplished by passing the heat fusible foam sheet through a single extrude line twice.

3. The process of claim 1 wherein extruding the resinous polymeric material onto both sides of the heat fusible foam sheet is accomplished by passing the heat fusible foam sheet through a two extruder line.

4. The process of claim 1 wherein the ratio of arc diameter to thickness of a reverse wrapped heat fusible foam sheet coated on one side is never less than 180.

5. The process of claim 4 wherein the ratio of arc diameter to thickness of a reverse wrapped heat fusible foam sheet coated on two sides is never less than 240.

6. The process of claim 1 wherein the resinous polymeric material is acrylonitrile-butadiene-styrene, acrylonitrile styrene, polyvinylchloride crystalline polystyrene or rubber modified polystyrene.

7. The process of claim 1 wherein the heat fusible foam sheet is polystyrene, styrene copolymers or polyvinylchloride.

8. The process of claim 1 wherein the polymeric resinous material is extruded at a temperature of about 450° F.

9. The process of claim 1 wherein the polymeric resinous material is extruded through a flat film die under a pressure of between 1,000 and 5,000 pounds per square inch.

10. The process of claim 1 wherein the polymeric resinous material is extruded through the flat film die under a pressure of about 1,500 pounds per square inch.

11. The process of claim 1 wherein a roller means, comprises of a nip roller, a chill roller and a third roller; and a rewind roller are used to pass the heat fusible foam sheet past the flat film die during the cooling process.

12. The process of claim 11 wherein the linear speed of the heat fusible foam sheet is about 100 to 2,000 feet per minute.

13. The process of claim 12 wherein the tension on the sheet is between 6 and 20 pounds per linear inch.

14. The process of claim 11 wherein the nip roller is heated to between 100° and 200° F.

15. The process of claim 11 wherein the chill roller additionally cools the coated heat fusible foam sheet and imparts desirable surface characteristics to the side last coated.

16. The process of claim 15 wherein the chill roller is maintained at a temperature between 40° and 80° F.

17. The process of claim 1 wherein the heat fusible foam sheet and the resinous polymeric material are compressed by a nip roller and a chill roller.

18. The process of claim 17 wherein the resinous polymeric material and the heat fusible foam sheet are compressed sufficiently to press the resinous polymeric material into the heat fusible foam sheet.

19. The process of claim 1 wherein the heat fusible foam sheet is polyethylene and the resinous polymeric material is polyethylene.

20. The process of claim 1 wherein the heat fusible foam sheet is polypropylene and the resinous polymeric material is polypropylene.

PO-1050
(5/69)

UNITED STATES PATENT OFFICE
CERTIFICATE OF CORRECTION

Patent No. 3,616,020          Dated 10/26/71

Inventor(s) Mark W. Whelan and Arthur J. Sedani

It is certified that error appears in the above-identified patent and that said Letters Patent are hereby corrected as shown below:

| Column | Line | |
|---|---|---|
| 2 | 71 | "prior heat" should be "prior art heat". |
| 3 | 8 | "colled" should be "cooled". |
| 3 | 45 | "1,5000" should be "1,500". |
| 5 | 35 | "extrude" should be "extruder". |
| 6 | 17 | "comprises" should be "comprised". |

Signed and sealed this 22nd day of August 1972.

(SEAL)
Attest:

EDWARD M. FLETCHER, JR.
Attesting Officer

ROBERT GOTTSCHALK
Commissioner of Patents